United States Patent
Gorokhov et al.

(10) Patent No.: US 8,509,194 B2
(45) Date of Patent: Aug. 13, 2013

(54) DIRTY PAPER CODING AND REFERENCE SIGNAL DESIGN

(75) Inventors: Alexei Yurievitch Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 12/912,267

(22) Filed: Oct. 26, 2010

(65) Prior Publication Data

US 2012/0099669 A1    Apr. 26, 2012

(51) Int. Cl.
*H04B 7/216* (2006.01)

(52) U.S. Cl.
USPC ............................................. 370/335

(58) Field of Classification Search
USPC ................... 370/201, 204, 206, 328–339
See application file for complete search history.

(56) References Cited

U.S. PATENT DOCUMENTS

| | | | |
|---|---|---|---|
| 7,369,526 B2 | 5/2008 | Lechleider et al. | |
| 7,630,337 B2 | 12/2009 | Zheng et al. | |
| 8,238,471 B2 * | 8/2012 | Hwang et al. | 375/296 |
| 8,238,954 B2 * | 8/2012 | Liu et al. | 455/501 |
| 2006/0210070 A1 | 9/2006 | Reznik et al. | |
| 2007/0211813 A1 | 9/2007 | Talwar et al. | |
| 2008/0046949 A1 * | 2/2008 | Liu | 725/118 |
| 2008/0141079 A1 * | 6/2008 | Chindapol et al. | 714/701 |
| 2009/0274235 A1 | 11/2009 | Lee et al. | |
| 2009/0323848 A1 * | 12/2009 | Guthy et al. | 375/267 |
| 2011/0064160 A1 * | 3/2011 | Haustein et al. | 375/267 |

FOREIGN PATENT DOCUMENTS

| | | |
|---|---|---|
| EP | 2111006 A1 | 10/2009 |
| WO | 2007044484 A2 | 4/2007 |
| WO | 2008060105 A1 | 5/2008 |
| WO | 2008073335 A2 | 6/2008 |

OTHER PUBLICATIONS

Peel et al, Linear and Dirty-Paper Techniques for the Multi-User MIMO Downlink, John Wiley & Sons, Ltd, 35 pages, 2005.*
Spencer et al., "Adaptive Antennas and MIMO Systems for Wireless Communications—An Introduction to the Multi-User MIMO Downlink", IEEE Communications Magazine, Oct. 2004, pp. 60-67, vol. 42, Issue 10, ISSN: 0163-6804; INSPEC Accession No. 8155624 Digital Object Identifier: 10.1109/MCOM.2004.1341262 Current Version Published: Oct. 8, 2004.
International Search Report and Written Opinion—PCT/US2011/057364—ISA/EPO—Feb. 23, 2012.

* cited by examiner

*Primary Examiner* — Frank Duong

(57) ABSTRACT

A method of wireless communication includes receiving a signal comprising an encoded downlink reference signal (DL-RS) modified by an effective channel. The encoded DL-RS is encoded based on crosstalk interference. The method further includes estimating the effective channel.

42 Claims, 12 Drawing Sheets

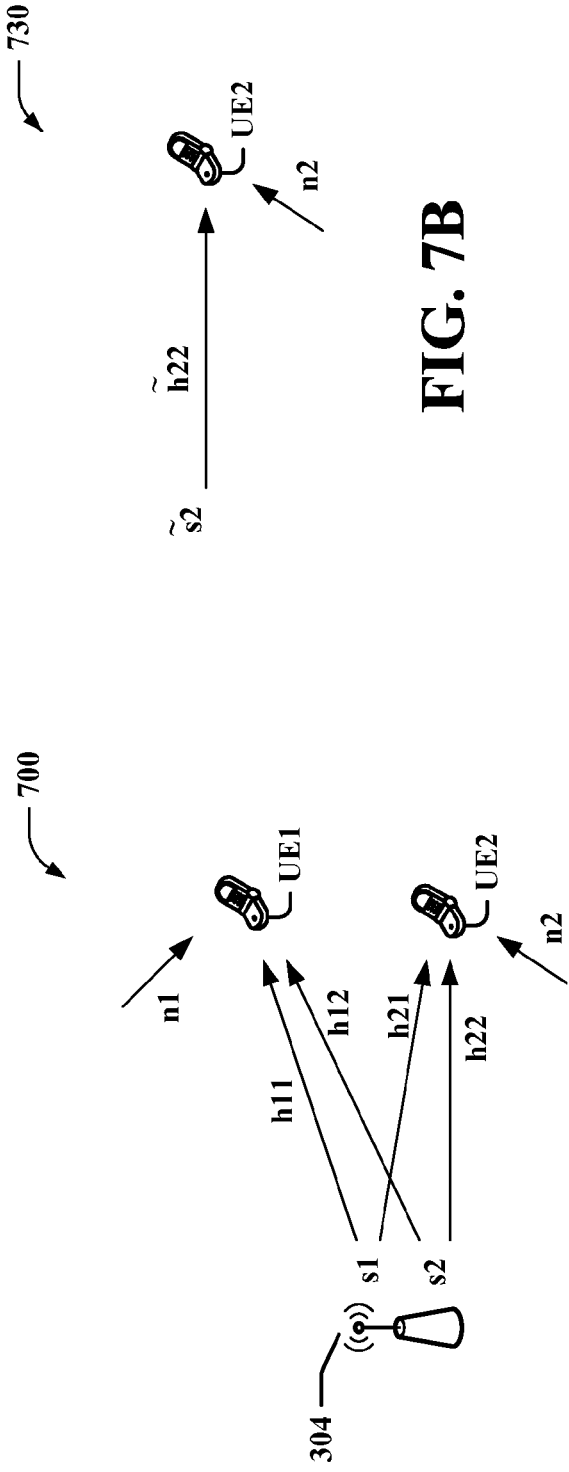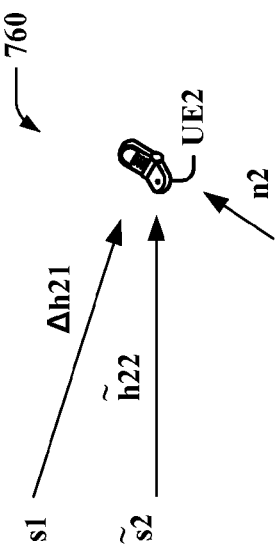
FIG. 7B
FIG. 7C
FIG. 7A

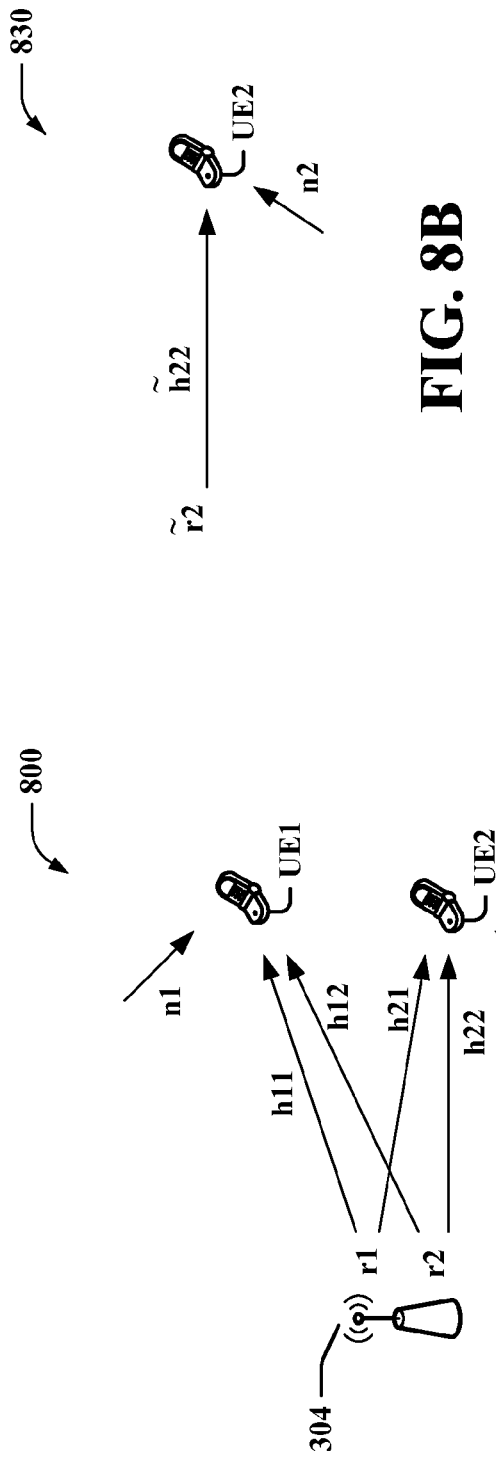
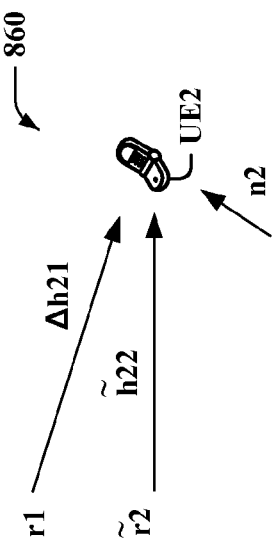
FIG. 8B
FIG. 8C
FIG. 8A

DIRTY PAPER CODING AND REFERENCE SIGNAL DESIGN

BACKGROUND

1. Field

The present disclosure relates generally to communication systems, and more particularly, to dirty paper coding (DPC) and reference signal (RS) design.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

DPC is a transmission technique that can be used to achieve theoretical capacity limit of a general broadcast channel. Hence DPC can be seen as enhancement of the existing DL multi-user transmission techniques that are based on time, frequency, and/or spatial orthogonalization and, in general, make use of a linear transmit precoding. Unlike the aforementioned techniques, DPC relies on non-linear transmit processing.

SUMMARY

In an aspect of the disclosure, a method of wireless communication includes receiving a signal comprising an encoded downlink reference signal (DL-RS) modified by an effective channel. The encoded DL-RS is encoded based on crosstalk interference. The method further includes estimating the effective channel.

In an aspect of the disclosure, a method of wireless communication includes encoding a downlink reference signal (DL-RS) based on crosstalk interference and transmitting the encoded DL-RS.

In an aspect of the disclosure, an apparatus for wireless communication includes means for receiving a signal comprising an encoded downlink reference signal (DL-RS) modified by an effective channel. The encoded DL-RS is encoded based on crosstalk interference. The apparatus further includes means for estimating the effective channel.

In an aspect of the disclosure, an apparatus for wireless communication includes means for encoding a downlink reference signal (DL-RS) based on crosstalk interference and means for transmitting the encoded DL-RS.

In an aspect of the disclosure, a computer program product includes a computer-readable medium. The computer-readable medium includes code for receiving a signal comprising an encoded downlink reference signal (DL-RS) modified by an effective channel. The encoded DL-RS is encoded based on crosstalk interference. The computer-readable medium further includes code for estimating the effective channel.

In an aspect of the disclosure, a computer program product includes a computer-readable medium. The computer-readable medium includes code for encoding a downlink reference signal (DL-RS) based on crosstalk interference and transmitting the encoded DL-RS.

In an aspect of the disclosure, an apparatus for wireless communication includes a processing system. The processing system is configured to receive a signal comprising an encoded downlink reference signal (DL-RS) modified by an effective channel. The encoded DL-RS is encoded based on crosstalk interference. The processing system is further configured to estimate the effective channel.

In an aspect of the disclosure, an apparatus for wireless communication includes a processing system. The processing system is configured to encode a downlink reference signal (DL-RS) based on crosstalk interference and to transmit the encoded DL-RS.

BRIEF DESCRIPTION OF THE DRAWINGS

FIG. 7A is a first diagram illustrating DPC.

FIG. 7B is a second diagram illustrating DPC.

FIG. 7C is a third diagram illustrating DPC.

FIG. 8A is a first diagram illustrating DPC as applied to DL-RS.

FIG. 8B is a second diagram illustrating DPC as applied to DL-RS.

FIG. 8C is a third diagram illustrating DPC as applied to DL-RS.

DETAILED DESCRIPTION

Figure 1:
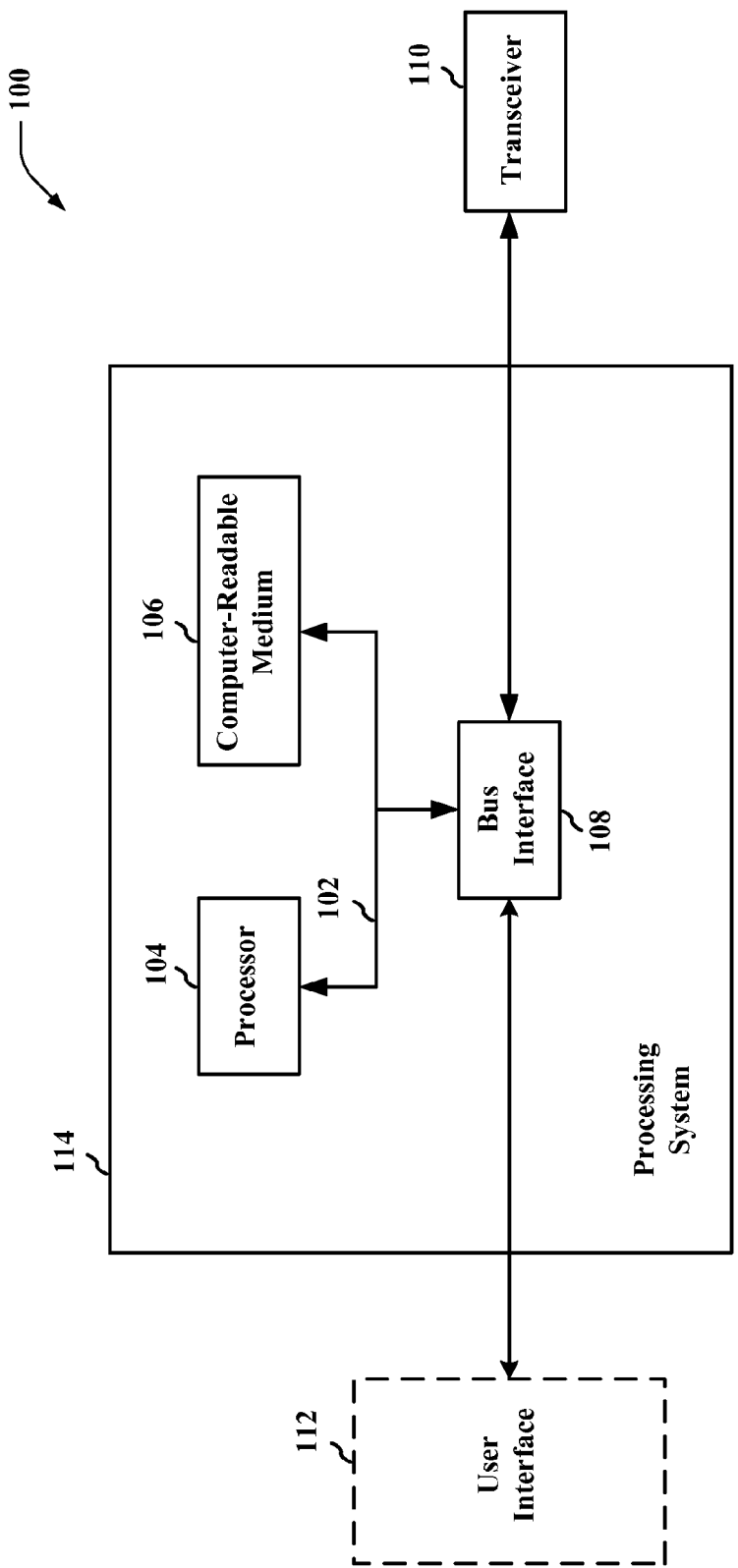
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
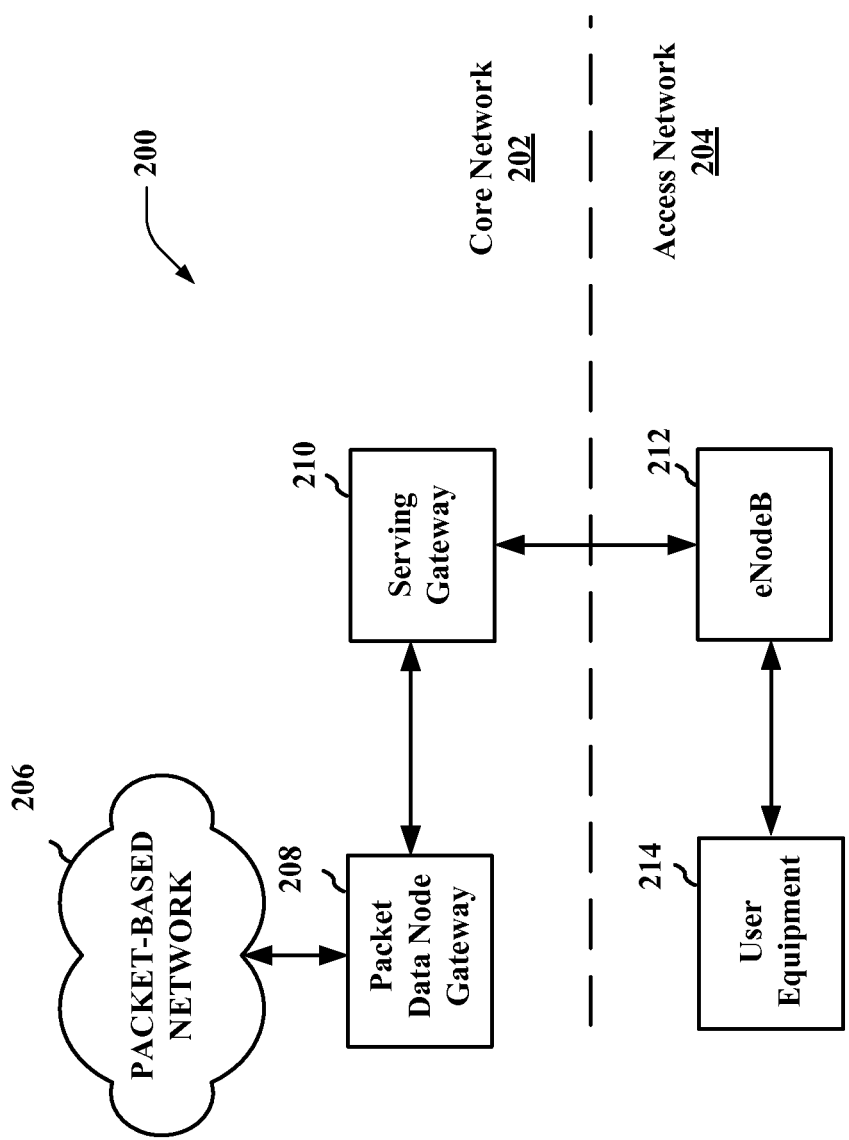
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
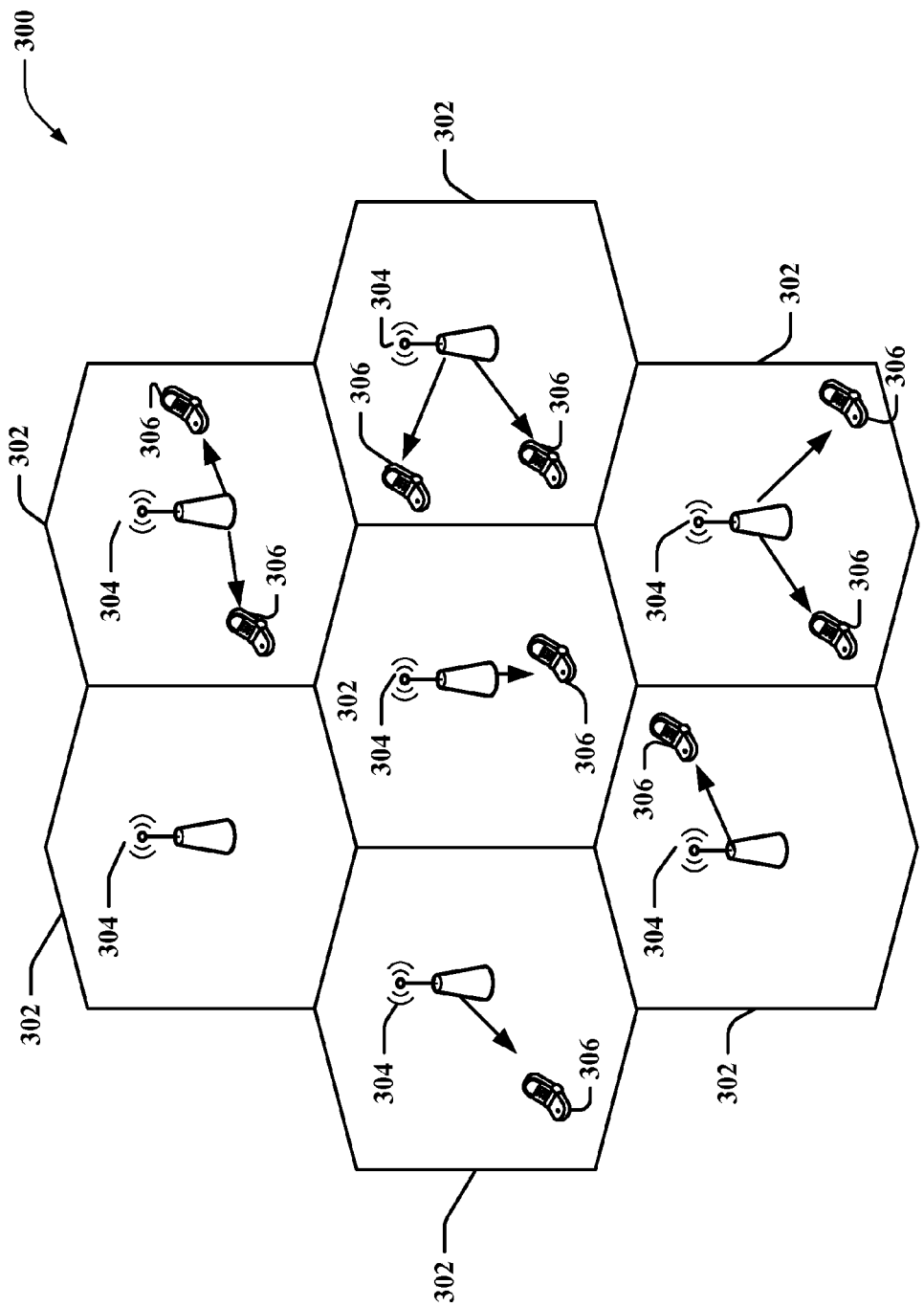
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
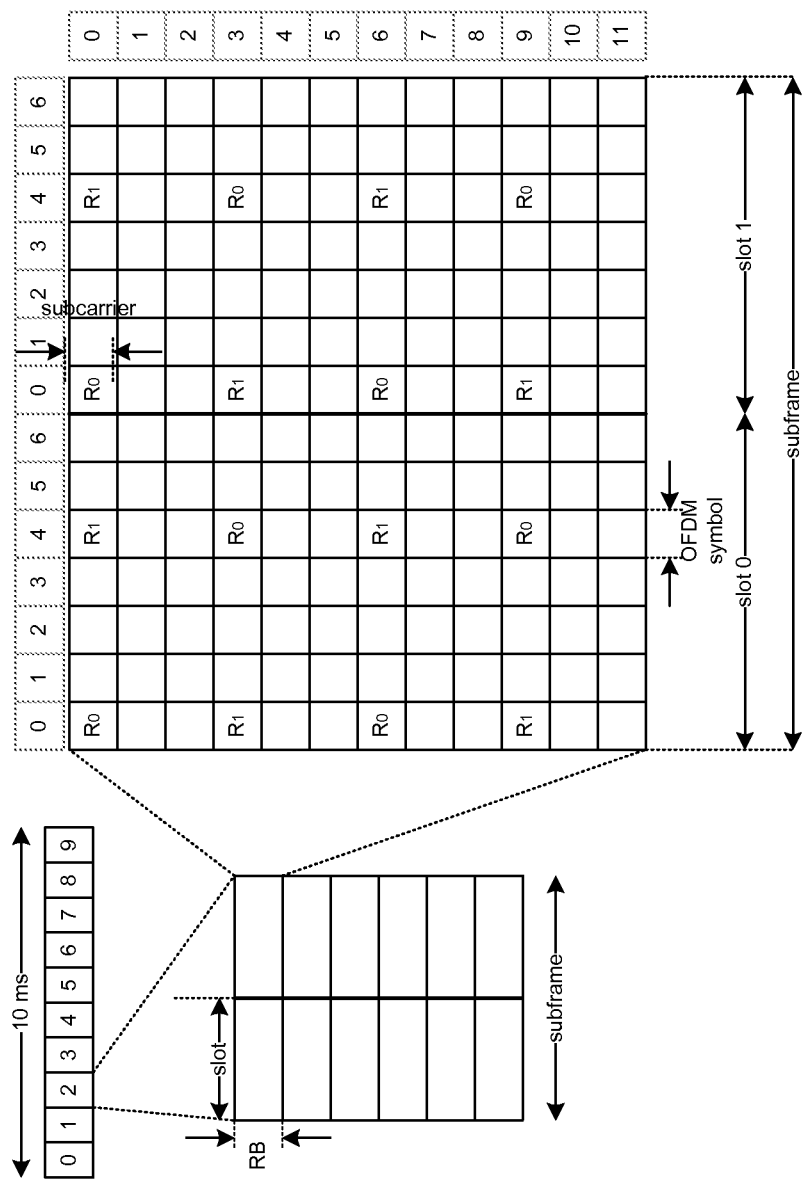
FIG. 4 is a conceptual diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as $R_0$ and $R_1$, include a DL reference signal (DL-RS). The DL-RS include Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
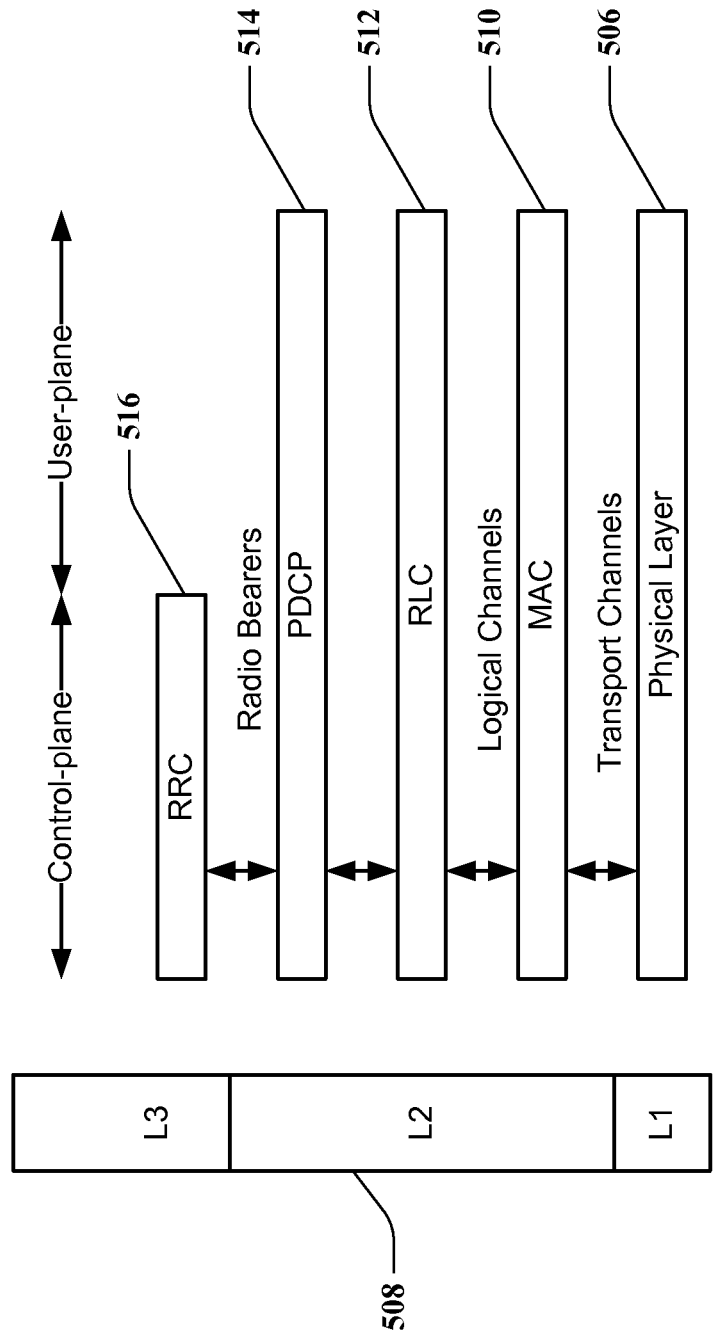
FIG. 5 is a conceptual diagram illustrating an example of a radio protocol architecture for the user and control plane.

The radio protocol architecture may take on various forms depending on the particular application. An example for an LTE system will now be presented with reference to FIG. 5. FIG. 5 is a conceptual diagram illustrating an example of the radio protocol architecture for the user and control planes.

Turning to FIG. 5, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control pane, the radio protocol architecture for the UE and eNodeB is substantially the same for the physical layer 506 and the L2 layer 508 with the exception that there is no header compression function for the control plane. The control pane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
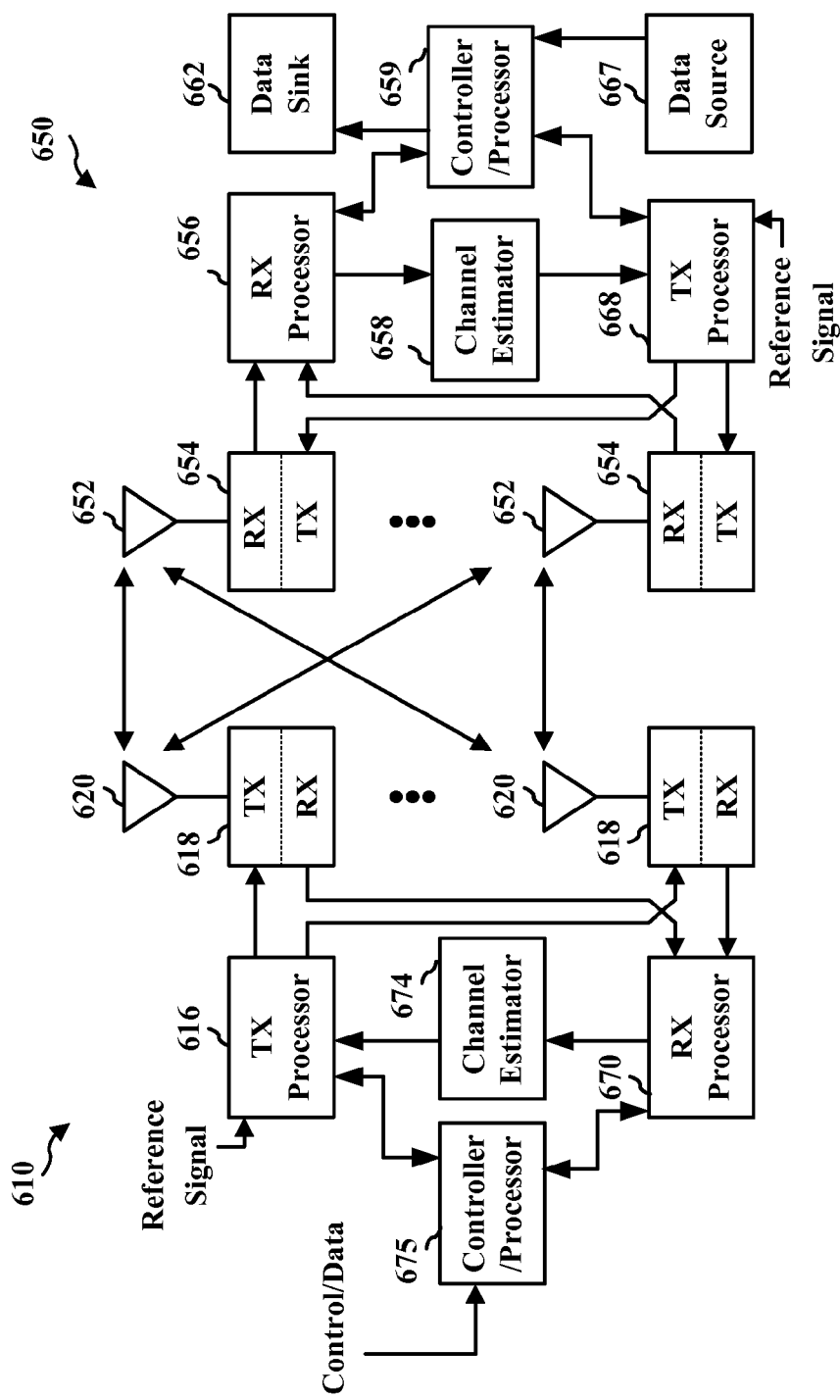
FIG. 6 is a conceptual diagram illustrating an example of an eNodeB and UE in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer described earlier in connection with FIG. 5. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer described earlier in connection with FIG. 5. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer (L2). Similar to the functionality described in connection with the DL transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1 layer.

The controller/processor 659 implements the L2 layer described earlier in connection with FIG. 5. In the UL, the control/processor 659 provides demultiplexing between transport and logical channels, packet reassembly, deciphering, header decompression, control signal processing to recover upper layer packets from the UE 650. Upper layer packets from the controller/processor 675 may be provided to the core network. The controller/processor 659 is also responsible for error detection using an acknowledgement (ACK) and/or negative acknowledgement (NACK) protocol to support HARQ operations.

The processing system 100 described in relation to FIG. 1 includes the eNodeB 610. In particular, the processing system 100 includes the TX processor 616, the RX processor 670, and the controller/processor 675. The processing system 100 described in relation to FIG. 1 includes the UE 650. In particular, the processing system 100 includes the TX processor 668, the RX processor 656, and the controller/processor 659.

FIG. 7A is a first diagram 700 illustrating DPC. A demodulation RS design for enabling robust demodulation of DPC transmissions is provided infra. Traditional approaches to RS design for downlink demodulation follow either of the two basic principles:

CRS—Transmit common RS signatures corresponding to each shared transmit entity (such as a physical or virtual antenna) at the cell, with RS signatures being known to every UE served by the cell. Additionally, the cell conveys UE-specific transmit parameters such as beam direction, traffic-to-pilot ratio (TPR), and the like, to each served UE thereby enabling downlink channel reconstruction based on CRS and UE-specific transmit parameters.

UE-RS—The RS undergoes the same transmit processing as the actual traffic transmission to the UE. This would imply using the same beam direction and TPR (or at least TPR with a fixed predefined offset) for the RS and the traffic signal. The UE-specific signature needs to be known to the target UE only and transmit processing becomes fully transparent to the UE.

Both RS approaches secure robustness with respect to imperfect tuning of the transmit (precoding) parameters at the serving cell 304 and/or a mismatch between transmit parameters and the actual channel state due to, for example, time/frequency selectivity. With a proper choice of RS (in terms of the amount of RS resources, choice of RS to suitably orthogonalize RS of different antennas or MIMO streams), the UE will be able to estimate the actual channel and interference statistics regardless of the transmit parameters used by the serving and interfering cells. This robustness property is lost in the case of DPC transmission as the standard RS design provides no information to the UE regarding the mismatch between transmit processing and the actual downlink channel state. Applying the DPC encoding principle to the RS transmission helps to regain the desired robustness.

DPC Encoding

DPC encoding and the robustness issue are illustrated in the following example as illustrated in FIG. 7A. Assume that serving cell 304 serves the $UE_1$ and the $UE_2$ over certain shared time-frequency resources with the following channels:

$$\begin{bmatrix} x_1 \\ x_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix}, \quad \text{(Eq. 1)}$$

where $h_{11}$ is the channel of the intended transmission from the serving cell 304 to the $UE_1$, $h_{22}$ is the channel of the intended transmission from the serving cell 304 to the $UE_2$, $h_{12}$ is the crosstalk channel observed by the $UE_1$ and represents the crosstalk between the signals intended for the $UE_2$ and the $UE_1$, $h_{21}$ is the crosstalk channel observed by the $UE_2$ and represents the crosstalk between the signals intended for the $UE_1$ and the $UE_2$, $n_1$ is the mixture of external (e.g., other cell) interference and thermal noise observed by the $UE_1$, and $n_2$ is the mixture of external (e.g., other cell) interference and thermal noise observed by the $UE_2$.

In Eq. 1, channel components already account for transmit processing performed by the serving cell 304. Furthermore, Eq. 1 accounts for time and/or frequency selective channels although time/frequency dependency of channel parameters is omitted for the sake of simplicity.

In a typical situation where DPC yields attractive capacity gains over a resource orthogonalization approach, one of the transmit streams will observe a limited crosstalk while the second one observes non-negligible cross talk where DPC is applied. Without the loss of generality, let us assume that the crosstalk term $h_{12}s_2$ is weak relative to $n_1$. In practice, this situation occurs whenever the $UE_1$ observes a strong external interference (e.g., at the cell edge) compared to the $UE_2$ and/or when the transmit beams and/or the power allocation are suitably chosen to minimize the crosstalk to the $UE_1$. In this example, the data transmission to the $UE_1$ would undergo regular linear precoding and the crosstalk contribution would be treated as part of the overall interference. Conversely, the data transmission to the $UE_2$ would undergo a non-linear DPC encoding. In DPC, the serving cell 304 chooses signal $s_2$ so that the resulting mixture with the interfering transmission $s_1$ is $$h_{21}s_1 + h_{22}s_2 = \tilde{h}_{22}\tilde{s}_2, \quad \text{(Eq. 2)}$$

where $\tilde{s}_2$ is mapped by the UE receiver to the information message directed to the $UE_2$. Choosing $s_2$ to satisfy Eq. 2 eliminates the interference term $h_{21}s_1$ from $x_2$, such that the $UE_2$ receiver observes $$x_2 = \tilde{h}_{22}\tilde{s}_2 + n_2. \quad \text{(Eq. 3)}$$

FIG. 7B is a second diagram 730 illustrating DPC. As shown in FIG. 7B, with DPC, the $UE_2$ effectively receives $\tilde{h}_{22}\tilde{s}_2 + n_2$. The term $\tilde{s}_2$ depends not only on the data directed to the $UE_2$ and the channels $h_{21}$, $h_{22}$ but also on the interfering signal $s_1$. The value of $\tilde{s}_2$ is usually selected subject to the interfering signal $s_1$ so as to minimize the magnitude of $s_2$ thereby leading to a minimum transmit energy per bit for the $UE_2$. Practical DPC encoders have been discussed at length in the literature and range from early designs based on convolutional encoders with a subset of input bits selected to minimize the total transmit energy to more recent encoding schemes (e.g., modulo-lattice coding). An important feature of the DPC transmission scheme is transparency with respect to the interfering transmission. With the aforementioned encoding scheme, the $UE_2$ may be unaware of the presence of $s_1$ and the associated crosstalk parameter $h_{21}$.

FIG. 7C is a third diagram 760 illustrating DPC. The Eq. 2 holds only when the transmit processing at the serving cell 304 is accurately matched to the downlink channel towards the $UE_2$. The latter condition will not be met in a practical setting due to channel variations in time/frequency/space as well as limited feedback accuracy and potential scheduling constraints. As shown in FIG. 7C, the signal received by the $UE_2$ therefore includes a residual interference $\Delta h_{21}s_1$ and can be written as $$h_{21}s_1 + h_{22}s_2 = \tilde{h}_{22}\tilde{s}_2 + \Delta h_{21}s_1,$$

where the residual crosstalk channel $\Delta h_{21}$ arises from the mismatch between the desired (DPC) transmit processing and the actual downlink channel to the $UE_2$.

With the traditional RS transmission approaches, the serving cell 304 would transmit CRS from physical or virtual antennas and signal UE-specific transmission (precoding) parameters or, alternatively, would transmit UE-RS precoded in the same way as the traffic transmission. In both cases, the RS transmission would allow the served $UE_2$ to recover the resulting linear channel $\tilde{h}_{22}$. While this information is sufficient to demodulate $\tilde{s}_{22}$ in the case of perfect transmit processing, neither the transmitter (serving cell 304) nor the receiver ($UE_2$) can account for the residual crosstalk when $\Delta h_{21} \neq 0$. Such unaccounted interference could substantially affect link capacity. First, the residual crosstalk level can vary in time and/or frequency across UE assignments. As the $UE_2$ is unable to gauge the level of interference in different resources, all the received data (e.g., soft symbols) coming from different resources would be combined regardless of the residual interference level thereby leading to poor performance because resources with the worst interference will likely dominate performance. Furthermore, the inability to capture residual crosstalk in UE reports (e.g., CQI and/or rank) will affect link adaptation potentially leading to further performance loss.

RS Structure for DPC

FIGS. 8A, 8B, and 8C are diagrams illustrating DPC as applied to DL-RS. In an exemplary configuration, RS transmission is enabled in which the RS undergoes DPC precoding just like the corresponding data transmission. In the context of the example supra, as shown in FIG. 8A, the serving cell 304 will transmit, on the UE-RS resources of the $UE_2$, the following signals:

RS $r_1$, which is transmitted to the $UE_1$ with the same (precoding) parameters as the actual traffic transmission that targets the $UE_1$; and RS $r_2$, which is transmitted to the $UE_2$ and which is chosen as a function of $r_1$, $h_{21}$, and $h_{22}$ so that the transmitted linear combination of $r_1$ and $r_2$ maps to $\tilde{r}_2$ which is a RS sequence known to the $UE_2$: $h_{21}r_1 + h_{22}r_2 = \tilde{h}_{22}\tilde{r}_2$.

Instead of defining a single RS sequence $\tilde{r}_2$, there may be a value in defining a set $\mathcal{R}_2$ of possible sequences so that the serving cell 304 chooses the "best" RS sequence $\tilde{r}_2 \in \mathcal{R}_2$ leading to the minimum energy of $\tilde{r}_2$ while the $UE_2$ receiver hypothesizes of all sequences from $\mathcal{R}_2$.

As shown in FIG. 8B, in the absence of a transmit processing mismatch, the $UE_2$ receives the RS in the form $y_2 = \tilde{h}_{22}\tilde{r}_2 + n_2$, which yields an estimate of the resulting channel $\tilde{h}_{22}$ and statistics (e.g., covariance structure) of the interference $n_2$, consistent with the absence of the residual crosstalk. Covariance structure means a covariance matrix in space and/or time and/or frequency. As shown in FIG. 8C, in the presence of a transmit processing mismatch, the $UE_2$ receives the RS in the form $y_2 = \tilde{h}_{22}\tilde{r}_2 + \Delta h_{21}r_1 + n_2$, which yields the same channel estimate and the overall interference that includes external component $n_2$ as well as the crosstalk contribution $\Delta h_{21}r_1$. The $UE_2$ does not need to be aware of the structure or presence of $r_1$. The RS $r_1$ can be UE-RS of $UE_1$, and therefore the RS for both UEs can share the same time/frequency and partly power resources. The knowledge of the sequence $r_1$ can be used when appropriate to improve estimation of the crosstalk term at $UE_2$. That is, the $UE_2$ may know the sequence $r_1$, may be informed by the serving cell that another UE may be receiving $r_1$, and therefore may then improve estimation of the crosstalk term through use of the sequence $r_1$.

While such encoding of RS for DPC precoded transmission can be seen as an extension of the aforementioned UE-RS approach used for linear precoding techniques, certain aspects of DPC RS design should be considered. In the case of linear precoding, UE-RS design targets (local) orthogonality (e.g., in time/frequency/code space) across transmitted streams (UEs and/or MIMO streams) in order to improve channel estimation accuracy. In the standard UE-RS transmission schemes, fulfilling this requirement amounts to generating RS sequences $r_1$ and $r_2$ targeting the $UE_1$ and the $UE_2$, respectively, such that portions of these sequences that are mapped to co-located sets of time and/or frequency resources are mutually orthogonal. In the case of DPC precoded RS, extension of such design would imply achieving orthogonality between $r_1$ and $\tilde{r}_2$ which may be challenging because $\tilde{r}_2$ depends on the channel conditions $h_{21}$, $h_{22}$.

The following RS multiplexing options can be considered:

(A) RS $r_2$ transmission to the $UE_2$, as explained supra, where RS $r_1$ is transmitted to $UE_1$ on the same resources (e.g., same OFDM symbol and subcarrier—see FIG. 4) as the RS $r_2$ transmission to $UE_2$. The advantage of this approach is that bandwidth/power RS resources for the $UE_1$ are reused for RS transmission to the $UE_2$. The main drawback is the lack of orthogonality leading to interference from the second RS ($r_2$) to the first RS ($r_1$). (In this option, the $UE_1$ experiences the interference due to the crosstalk $h_{12}r_2$.)

(B) RS $r_2$ transmission to the $UE_2$, as explained supra, on a first set of resources and the RS $r_1$ transmission to the $UE_1$ on a separate set of resources in terms of bandwidth (e.g., time/frequency/code dimension) as well as power. The advantages and drawbacks are swapped compared to (A).

(C) RS $r_2$ transmission to the $UE_2$ can be superposed on the traffic transmission of the $UE_1$ so that traffic symbols (i.e., data) sent to the $UE_1$ play the role of $r_1$ in the above equations. This option seems to be always better than (B). (In this option, the $UE_2$ would not be able to determine the channel mismatch $\Delta h_{21}$ or the residual interference/crosstalk $\Delta h_{21}r_1$.)

While all the options need to be carefully evaluated in terms of channel estimation performance, option (A) may be preferred to (B). As explained supra, DPC is mostly effective in the scenarios where, in the example supra, the overall interference to the $UE_1$ is dominated by the external term $n_1$ rather than the crosstalk term. Based on the same argument, (A) may turn to be better than (C).

A different precoding code may be used for the RS and the data. In particular, a lower complexity code or a shorter code (with fewer hypotheses) may be used. Using a lower complexity code or a shorter code reduces the complexity of the channel estimation. There may also be a tradeoff in which the weaker code results in a higher power on the RS than the data. In such a case, the traffic to pilot ratio may be signaled to the UE, or blindly estimated by the UE.

Additionally, a two-stage process including a non-DPC precoded RS and a precoded-RS may be used. The receiver can use the non-DPC precoded RS to obtain a coarse channel and interference estimate (without accounting for the effects of DPC leakage). This in turn can be used in demodulating the precoded DRS which can provide a better channel estimate and an interference estimate that accounts for the effects of DPC leakage.

The above examples can be readily extended to the case of greater than two UEs and/or the number of MIMO streams per UE. Additionally, such a design may also be used for a "power decision pilot channel" or a Rate Prediction-RS (RP-RS), in which an RS with the same precoding as the data is transmitted prior to the data. The UE measures the quality of the RP-RS and sends back CQI feedback based on the measured quality. The RP-RS can enable accurate rate prediction. The DPC and RS design is applicable to DL-RS, which includes demodulation RS and RP-RS. Demodulation RS includes CRS and UE-RS. However, in one configuration, DPC and RS design is applicable to UE-RS and RP-RS.

While DPC and RS design has been discussed in the context of flat fading scalar channels (non-MIMO transmission per UE), the concept readily extends to time/frequency selective channels and/or MIMO channels where reference signals are designed according to the provided principles and are provided for different signal dimensions (time/frequency/space). Furthermore, the RS encoding may be applied for different time and/or frequency resources and/or spatial dimensions (e.g., beams and/or virtual antennas).

Figure 9:
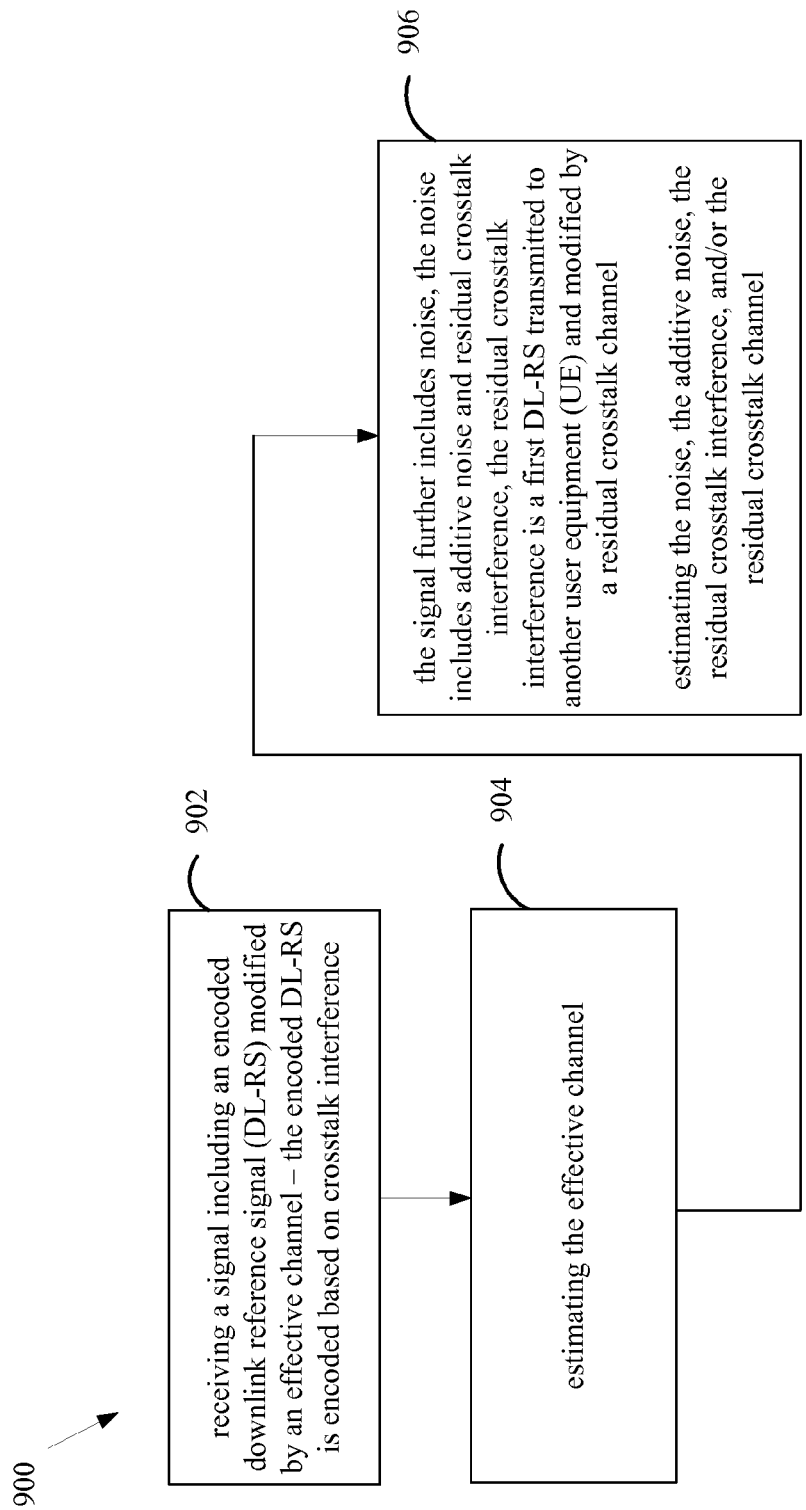
FIG. 9 is a flow chart of a method of wireless communication.

FIG. 9 is a flow chart 900 of a method of wireless communication. The method includes receiving a signal including an encoded downlink reference signal (DL-RS) modified by an effective channel (902). The encoded DL-RS is encoded based on crosstalk interference (902). The method further includes estimating the effective channel (904). In one configuration, the encoded DL-RS is encoded using dirty paper coding (DPC). In one configuration, the crosstalk interference is a first DL-RS transmitted to a first user equipment (UE) and modified by a crosstalk channel and the receiving and the estimating are performed by a second UE different from the first UE. In one configuration, the encoded DL-RS, $\tilde{r}_2$, is transmitted as a second DL-RS, $r_2$, in which $r_2$ satisfies the equation $h_{21}r_1 + h_{22}r_2 = \tilde{h}_{22}\tilde{r}_2$, where $h_{21}$ is the crosstalk channel between a transmission to the first UE and to the second UE, $r_1$ is the first DL-RS, $\tilde{h}_{22}$ is the effective channel from a serving cell, and $h_{22}$ is an actual channel from the serving cell. In one configuration, the received signal, $y_2$, is equal to $\tilde{h}_{22}\tilde{r}_2 + \Delta h_{21}r_1 + n_2$, where $\tilde{h}_{22}$ is the effective channel from a serving cell and is a function of the crosstalk interference, $\tilde{r}_2$ is the DL-RS encoded using dirty paper coding (DPC), and $\Delta h_{21}r_1 + n_2$ is noise with $\Delta h_{21}r_1$ being residual crosstalk interference, $n_2$ being external noise, $\Delta h_{21}$ being a residual crosstalk channel, and $r_1$ being the first DL-RS. External noise includes thermal noise and noise from other transmitted signals.

In one configuration, the signal further includes noise and the method further includes estimating the noise (906). In one configuration, the noise includes external noise and residual crosstalk interference and the method further includes estimating the external noise and the residual crosstalk interference (906). In one configuration, the method further includes determining at least one of a power or a covariance structure of each of the external noise and the residual crosstalk interference. In one configuration, the noise includes external noise and residual crosstalk interference, the residual crosstalk interference is a first DL-RS transmitted to a first user equipment (UE) and modified by a residual crosstalk channel, the transmitting and the estimating are performed by a second UE different from the first UE, and the method further includes estimating the residual crosstalk channel (906). In one configuration, the method further includes determining a DL-RS in a set of DL-RS to which the encoded DL-RS is equal.

Figure 10:
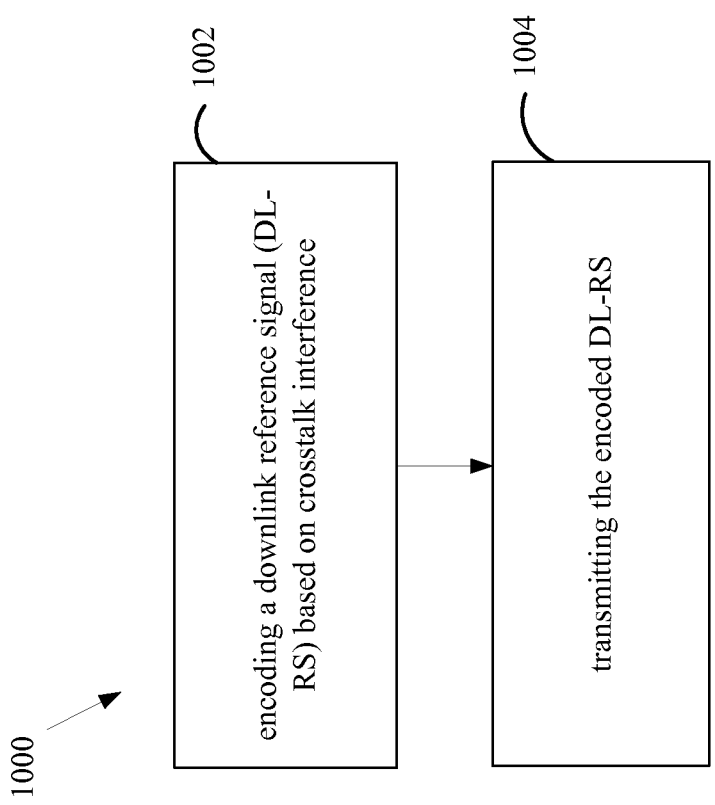
FIG. 10 is a flow chart of another method of wireless communication.

FIG. 10 is a flow chart 1000 of a method of wireless communication. The method includes encoding a downlink reference signal (DL-RS) based on crosstalk interference (1002) and transmitting the encoded DL-RS (1004). In one configuration, the encoded DL-RS is encoded using dirty paper coding (DPC). In one configuration, the method further includes transmitting a first DL-RS to a first UE. The encoded DL-RS is a second DL-RS and the transmitting the second DL-RS includes transmitting the second DL-RS to a second UE different from the first UE. In one configuration, the method further includes determining the crosstalk interference received by the second UE due to the first DL-RS transmitted to the first UE, determining an actual channel with the second UE, determining an effective channel with the second UE. The encoding includes setting the second DL-RS to a sequence based on the crosstalk interference, the actual channel, the effective channel, and a third DL-RS to be received by the second UE. In one configuration, the encoding includes setting the second DL-RS, $r_2$, to a sequence that satisfies the equation $h_{21}r_1 + h_{22}r_2 = \tilde{h}_{22}\tilde{r}_2$, where $h_{21}r_1$ is the crosstalk interference with $h_{21}$ being a crosstalk channel and $r_1$ being the first DL-RS, $h_{22}$ is the actual channel, $\tilde{h}_{22}$ is the effective channel, and $\tilde{r}_2$ is the third DL-RS. In one configuration, the method further includes selecting the third DL-RS from a set of possible DL-RS in order to minimize an energy of the second DL-RS. In one configuration, the first DL-RS is transmitted to the first UE and the second DL-RS is transmitted to the second UE using the same resources. In one configuration, the first DL-RS is transmitted to the first UE using first resources, the second DL-RS is transmitted to the second UE using second resources different from the first resources, and the method further includes transmitting the first DL-RS using the second resources. The first DL-RS sent to the second resources acts as residual interference for the second UE. The first UE may or may not even look at those resources. In one configuration, the method further includes transmitting data to a first UE. The transmitting the encoded DL-RS includes transmitting the encoded DL-RS to a second UE different from the first UE. The encoded DL-RS are transmitted superimposed on the data using the same resources as the data transmission to the first UE. In one configuration, the DL-RS includes at least one of demodulation RS or rate prediction RS.

Figure 11:
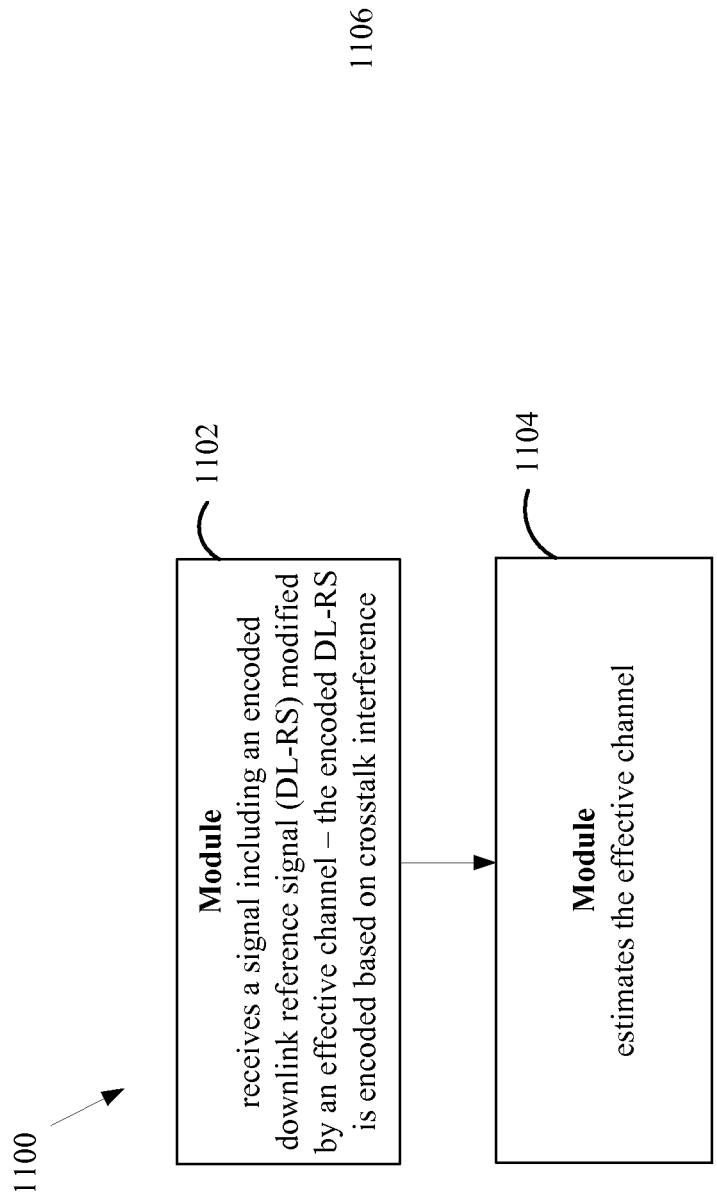
FIG. 11 is a conceptual block diagram illustrating the functionality of an exemplary apparatus.

FIG. 11 is a conceptual block diagram 1100 illustrating the functionality of an exemplary apparatus 100, which may be the UE 610. The apparatus 100 includes a module 1102 that receives a signal including an encoded downlink reference signal (DL-RS) modified by an effective channel. The encoded DL-RS is encoded based on crosstalk interference. The apparatus 100 further includes a module 1104 that estimates the effective channel.

Figure 12:
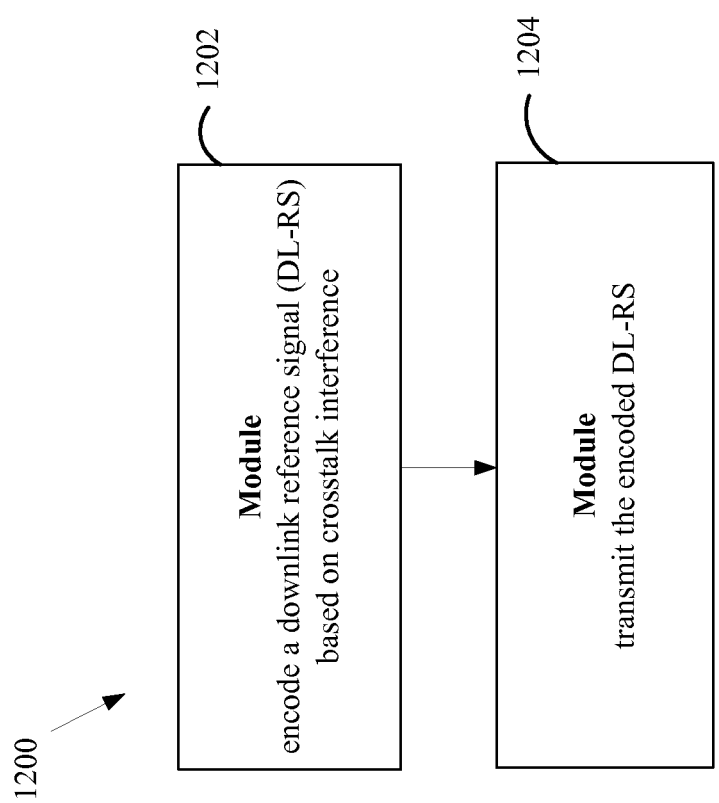
FIG. 12 is a conceptual block diagram illustrating the functionality of another exemplary apparatus.

FIG. 12 is a conceptual block diagram 1200 illustrating the functionality of an exemplary apparatus 100, which may be the eNodeB 650. The apparatus 100 includes a module 1202 that encodes a downlink reference signal (DL-RS) based on crosstalk interference and a module 1204 that transmits the encoded DL-RS.

In one configuration, the apparatus 100 for wireless communication includes means for encoding a downlink reference signal (DL-RS) based on crosstalk interference and means for transmitting the encoded DL-RS. In one configuration, the apparatus 100 further includes means for transmitting a first DL-RS to a first UE. The encoded DL-RS is a second DL-RS and the second DL-RS is transmitted to a second UE different from the first UE. In one configuration, the apparatus 100 further includes means for determining the crosstalk interference received by the second UE due to the first DL-RS transmitted to the first UE, means for determining an actual channel with the second UE, and means for determining an effective channel with the second UE. The means for encoding sets the second DL-RS to a sequence based on the crosstalk interference, the actual channel, the effective channel, and a third DL-RS to be received by the second UE. In one configuration, the means for encoding sets the second DL-RS, $r_2$, to a sequence that satisfies the equation $h_{21}r_1 + h_{22}r_2 = \tilde{h}_{22}\tilde{r}_2$, where $h_{21}r_1$ is the crosstalk interference with $h_{21}$ being a crosstalk channel and $r_1$ being the first DL-RS, $h_{22}$ is the actual channel, $\tilde{h}_{22}$ is the effective channel, and $\tilde{r}_2$ is the third DL-RS. In one configuration, the apparatus 100 further includes means for selecting the third DL-RS from a set of possible DL-RS in order to minimize an energy of the second DL-RS. In one configuration, the first DL-RS is transmitted to the first UE using first resources, the second DL-RS is transmitted to the second UE using second resources different from the first resources, and the apparatus 100 further includes means for transmitting the first DL-RS using the second resources. In one configuration, the apparatus 100 further includes means for transmitting data to a first UE. The means for transmitting the encoded DL-RS transmits the encoded DL-RS to a second UE different from the first UE. The encoded DL-RS are transmitted superimposed on the data using the same resources as the data transmission to the first UE. The aforementioned means is the processing system 114 configured to perform the functions recited by the aforementioned means. As described supra, the processing system 114 includes the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In one configuration, the apparatus 100 for wireless communication includes means for receiving a signal including an encoded downlink reference signal (DL-RS) modified by an effective channel. The encoded DL-RS is encoded based on crosstalk interference. The apparatus 100 further includes means for estimating the effective channel. In one configuration, the apparatus 100 includes means for estimating the noise. In one configuration, the apparatus 100 includes means for estimating the external noise and means for estimating the residual crosstalk interference. In one configuration, the apparatus 100 includes means for determining at least one of a power or a covariance structure of each of the external noise and the residual crosstalk interference. In one configuration, the apparatus 100 includes means for estimating the residual crosstalk channel. In one configuration, the apparatus 100 includes means for determining a DL-RS in a set of DL-RS to which the encoded DL-RS is equal. The aforementioned means is the processing system 114 configured to perform the functions recited by the aforementioned means. As described supra, the processing system 114 includes the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
receiving, at a first UE, a first downlink reference signal (DL-RS), the first DL-RS being encoded based at least in part on a crosstalk channel between a transmission to the first UE and a second UE, a second DL-RS for the second UE, an effective channel from a serving base station, and an actual channel from the serving base station; and
estimating, by the UE, the effective channel.

2. The method of claim 1, wherein the first DL-RS is encoded using dirty paper coding (DPC).

3. The method of claim 1, wherein crosstalk interference is received by the first UE due to the second DL-RS transmitted to the second UE and modified by the crosstalk channel.

4. The method of claim 3, wherein the first DL-RS, $\tilde{r}_2$, is transmitted as a third DL-RS, $r_2$, and is encoded based on the equation $h_{21}r_1 + h_{22}r_2 = \tilde{h}_{22}\tilde{r}_2$, in which $h_{21}$ is the crosstalk channel, $r_1$ is the second DL-RS, $\tilde{h}_{22}$ is the effective channel, and $h_{22}$ is the actual channel.

5. The method of claim 1, further comprising receiving a signal, $y_2$, in which the received signal is equal to $\tilde{h}_{22}\tilde{r}_2 + \Delta h_{21}r_1 + n_2$, in which $\tilde{h}_{22}$ is the effective channel and is a function of crosstalk interference, $\tilde{r}_2$ is the first DL-RS encoded using dirty paper coding (DPC), and $\Delta h_{21}r_1 + n_2$ is noise with $\Delta h_{21}r_1$ being residual crosstalk interference, $n_2$ being external noise, $\Delta h_{21}$ being a residual crosstalk channel, and $r_1$ being the first DL-RS.

6. The method of claim 1, wherein the signal further comprises noise and the method further comprises estimating the noise.

7. The method of claim 6, wherein the noise comprises external noise and residual crosstalk interference and the method further comprises estimating the external noise and the residual crosstalk interference.

8. The method of claim 7, further comprising determining at least a power of each of the external noise and the residual crosstalk interference, a covariance structure of each of the external noise and the residual crosstalk interference, or a combination thereof.

9. The method of claim 6, wherein the noise comprises external noise and residual crosstalk interference, the residual crosstalk interference is received by the first UE due to a first DL-RS transmitted to the second UE and modified by a residual crosstalk channel, and the method further comprises estimating the residual crosstalk channel.

10. The method of claim 1, further comprising determining a DL-RS in a set of DL-RS to which the first DL-RS is equal.

11. A method of wireless communication, comprising:
encoding a first downlink reference signal (DL-RS) based at least in part on actual traffic transmissions to a first UE;
transmitting the first DL-RS to the first UE;
encoding a second DL-RS based at least in part on a crosstalk channel between a transmission to a second UE and the first UE, the first DL-RS, an effective channel to the second UE, a third DL-RS to be received by the second UE, and an actual channel to the second UE; and
transmitting the second DL-RS to the second UE.

12. The method of claim 11, wherein the second DL-RS is encoded using dirty paper coding (DPC).

13. The method of claim 11, further comprising:
determining the crosstalk interference received by the second UE due to the first DL-RS transmitted to the first UE;

determining the actual channel with the second UE; and
determining the effective channel with the second UE.

14. The method of claim 13, wherein the encoding comprises setting the second DL-RS, $r_2$, to a sequence that satisfies the equation $h_{21}r_1+h_{22}r_2=\tilde{h}_{22}\tilde{r}_2$, in which $h_{21}r_1$ is crosstalk interference, $h_{21}$ is the crosstalk channel, $r_1$ is the first DL-RS, $h_{22}$ is the actual channel, $\tilde{h}_{22}$ is the effective channel, and $\tilde{r}_2$ is the third DL-RS.

15. The method of claim 13, further comprising selecting the third DL-RS from a set of possible DL-RS in order to minimize an energy of the second DL-RS.

16. The method of claim 11, wherein the first DL-RS is transmitted to the first UE and the second DL-RS is transmitted to the second UE using the same resources.

17. The method of claim 11, wherein the first DL-RS is transmitted to the first UE using first resources, the second DL-RS is transmitted to the second UE using second resources different from the first resources, and the method further comprises transmitting the first DL-RS using the second resources.

18. The method of claim 11, further comprising transmitting data to the first UE, wherein the second UE is different from the first UE, wherein the second DL-RS is transmitted by superimposing the second DL-RS on the data using the same resources as the data transmission to the first UE.

19. The method of claim 11, wherein the second DL-RS includes at least one of a demodulation RS or a rate prediction RS.

20. An apparatus for wireless communication, comprising:
means for receiving, at a first apparatus, a first downlink reference signal (DL-RS), the first DL-RS being encoded based at least in part on a crosstalk channel between a transmission to the first apparatus and a second apparatus, a second DL-RS for the second apparatus, an effective channel from a serving base station, and an actual channel from the serving base station; and
means for estimating the effective channel.

21. The apparatus of claim 20, wherein the first DL-RS is encoded using dirty paper coding (DPC).

22. The apparatus of claim 20, wherein crosstalk interference is received by the first apparatus due to the second DL-RS transmitted to another apparatus and modified by the crosstalk channel.

23. The apparatus of claim 22, wherein the first DL-RS, $\tilde{r}_2$, is transmitted as a third DL-RS, $r_2$, and is encoded based on the equation $h_{21}r_1+h_{22}r_2=\tilde{h}_{22}\tilde{r}_2$, in which $h_{21}$ is the crosstalk channel, $r_1$ is the second DL-RS, $\tilde{h}_{22}$ is the effective channel, and $h_{22}$ is the actual channel.

24. The apparatus of claim 20, further comprising means for receiving a signal, $y_2$, in which the received signal is equal to $\tilde{h}_{22}\tilde{r}_2+\Delta h_{21}r_1+n_2$, in which $\tilde{h}_{22}$ is the effective channel and is a function of the crosstalk interference, $\tilde{r}_2$ is the first DL-RS encoded using dirty paper coding (DPC), and $\Delta h_{21}r_1+n_2$ is noise with $\Delta h_{21}r_1$ being residual crosstalk interference, $n_2$ being external noise, $\Delta h_{21}$ being a residual crosstalk channel, and $r_1$ being the first DL-RS.

25. The apparatus of claim 20, wherein the signal further comprises noise and the apparatus further comprises means for estimating the noise.

26. The apparatus of claim 25, wherein the noise comprises external noise and residual crosstalk interference and the apparatus further comprises means for estimating the external noise and means for estimating the residual crosstalk interference.

27. The apparatus of claim 26, further comprising means for determining at least one of a power or a covariance structure of each of the external noise and the residual crosstalk interference.

28. The apparatus of claim 25, wherein the noise comprises external noise and residual crosstalk interference, the residual crosstalk interference is received by the first apparatus due to the second DL-RS transmitted to the second apparatus and modified by a residual crosstalk channel, and the first apparatus further comprises means for estimating the residual crosstalk channel.

29. The apparatus of claim 20, further comprising means for determining a DL-RS in a set of DL-RS to which the second DL-RS is equal.

30. An apparatus for wireless communication, comprising:
means for encoding a first downlink reference signal (DL-RS) based at least in part on actual traffic transmissions to a first UE;
means for transmitting the first DL-RS to the first UE;
means for encoding a second DL-RS based at least in part on a crosstalk channel between a transmission to a second UE and the first UE, the first DL-RS, an effective channel to the second UE, a third DL-RS to be received by the second UE, and an actual channel to the second UE; and
means for transmitting the second DL-RS to the second UE.

31. The apparatus of claim 30, wherein the second DL-RS is encoded using dirty paper coding (DPC).

32. The apparatus of claim 30, further comprising:
means for determining crosstalk interference received by the second UE due to the first DL-RS transmitted to the first UE;
means for determining the actual channel with the second UE; and
means for determining the effective channel with the second UE.

33. The apparatus of claim 32, wherein the means for encoding sets the second DL-RS, $r_2$, to a sequence that satisfies the equation $h_{21}r_1+h_{22}r_2=\tilde{h}_{22}\tilde{r}_2$, in which $h_{21}r_1$ is the crosstalk interference, $h_{21}$ is the crosstalk channel, $r_1$ is the first DL-RS, $h_{22}$ is the actual channel, $\tilde{h}_{22}$ is the effective channel, and $\tilde{r}_2$ is the third DL-RS.

34. The apparatus of claim 32, further comprising means for selecting the third DL-RS from a set of possible DL-RS in order to minimize an energy of the second DL-RS.

35. The apparatus of claim 30, wherein the first DL-RS is transmitted to the first UE and the second DL-RS is transmitted to the second UE using the same resources.

36. The apparatus of claim 30, wherein the first DL-RS is transmitted to the first UE using first resources, the second DL-RS is transmitted to the second UE using second resources different from the first resources, and the apparatus further comprises means for transmitting the first DL-RS using the second resources.

37. The apparatus of claim 30, further comprising means for transmitting data to the first UE, wherein the second UE is different from the first UE, wherein the second DL-RS is transmitted by superimposing the second DL-RS on the data using the same resources as the data transmission to the first UE.

38. The apparatus of claim 30, wherein the second DL-RS includes at least one of a demodulation RS or a rate prediction RS.

39. A computer program product, comprising:
a non-transitory computer-readable medium having program code recorded thereon, the program code comprising:
program code to receive, at a first user equipment (UE), a first downlink reference signal (DL-RS), the first DL-RS being encoded based at least in part on a crosstalk channel between a transmission to the first UE and a second apparatus, a second DL-RS for the second UE, an effective channel from a serving base station, and an actual channel from the serving base station; and
program code to estimate the effective channel.

40. A computer program product, comprising:
a non-transitory computer-readable medium having program code recorded thereon, the program code comprising:
program code to encode a first downlink reference signal (DL-RS) based at least in part on actual traffic transmissions to a first UE;
program code to transmit the first DL-RS to the first UE;
program code to encode a second DL-RS based at least in part on a crosstalk channel between a transmission to a second UE and the first UE, the first DL-RS, an effective channel to the second UE, a third DL-RS to be received by the second UE, and an actual channel to the second UE; and
program code to transmit the second DL-RS to the second UE.

41. An apparatus for wireless communication, comprising:
a memory unit; and
at least one processor coupled to the memory unit, the at least one processor configured:
to receive, at a first user equipment (UE), a first downlink reference signal (DL-RS), the first DL-RS being encoded based at least in part on a crosstalk channel between a transmission to the first UE and a second apparatus, a second DL-RS for the second UE, an effective channel from a serving base station, and an actual channel from the serving base station; and
to estimate the effective channel.

42. An apparatus for wireless communication, comprising:
a memory unit; and
at least one processor coupled to the memory unit, the at least one processor configured:
to encode a first downlink reference signal (DL-RS) based at least in part on actual traffic transmissions to a first UE;
to transmit the first DL-RS to the first UE;
to encode a second DL-RS based at least in part on a crosstalk channel between a transmission to a second UE and the first UE, the first DL-RS, an effective channel to the second UE, a third DL-RS to be received by the second UE, and an actual channel to the second UE; and
to transmit the second DL-RS to the second UE.

* * * * *